No. 809,509. PATENTED JAN. 9, 1906.
F. W. LANCHESTER.
MOTOR CAR.
APPLICATION FILED JUNE 3, 1905.

3 SHEETS—SHEET 2.

No. 809,509. PATENTED JAN. 9, 1906.
F. W. LANCHESTER.
MOTOR CAR.
APPLICATION FILED JUNE 3, 1905.

3 SHEETS—SHEET 3.

Witnesses:
Wilhelm Vogt
Thomas M. Smith

Inventor:
Frederick W. Lanchester,
By J. Walton Douglas
Attorney.

UNITED STATES PATENT OFFICE.

FREDERICK WILLIAM LANCHESTER, OF EDGBASTON, BIRMINGHAM, ENGLAND.

MOTOR-CAR.

No. 809,509.     Specification of Letters Patent.     Patented Jan. 9, 1906.

Application filed June 3, 1905. Serial No. 263,579.

*To all whom it may concern:*

Be it known that I, FREDERICK WILLIAM LANCHESTER, engineer, a subject of the King of Great Britain and Ireland, residing at 53 Hagley road, Edgbaston, Birmingham, England, have invented certain new and useful Improvements in Motor-Cars, of which the following is a specification.

This invention relates to improvements in motor-cars, and refers more particularly to improvements in the construction and arrangement of framework and motor in passenger-vehicles.

My present invention has for its object to permit of the constructional and engineering requirements of the vehicle being met with the least detriment possible to the arrangement of passenger accommodation.

In motor-cars as ordinarily constructed of the coupé or landaulet type there is an almost insurmountable difficulty to obtaining an unobstructed side entrance such as obtains in horse-drawn vehicles without employing an unreasonable length of wheel-base such as to render maneuvering in traffic inconvenient or impossible. There is also in order to minimize this difficulty a tendency to arrange the front axle farther back than is desirable from considerations of weight distribution.

My present invention in brief comprises an improved construction of frame or chassis and an improved arrangement of motor and mechanism so adapted as to permit of a better proportionate distribution of weight between the front and rear wheels, with room for an unobstructed side entrance, with a moderate length of wheel-base, and with a wider angle of lock than pertains to cars of the construction at present generally accepted.

Figure 1:
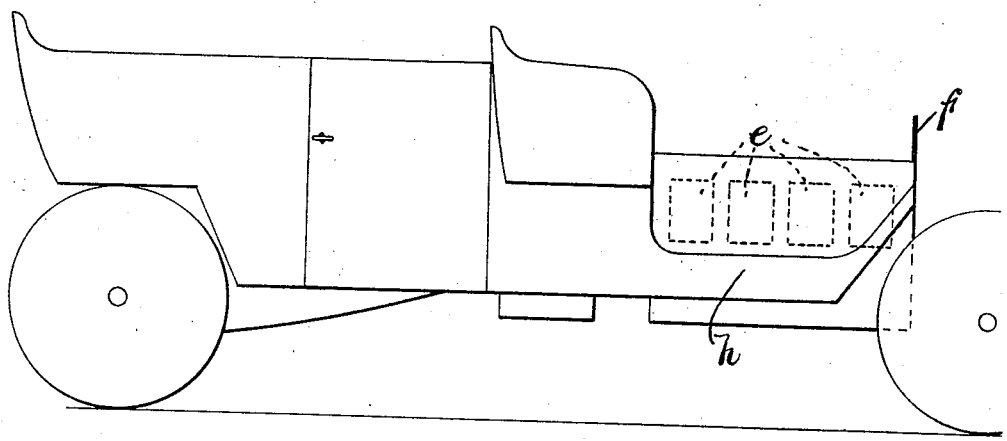
Figure 2:
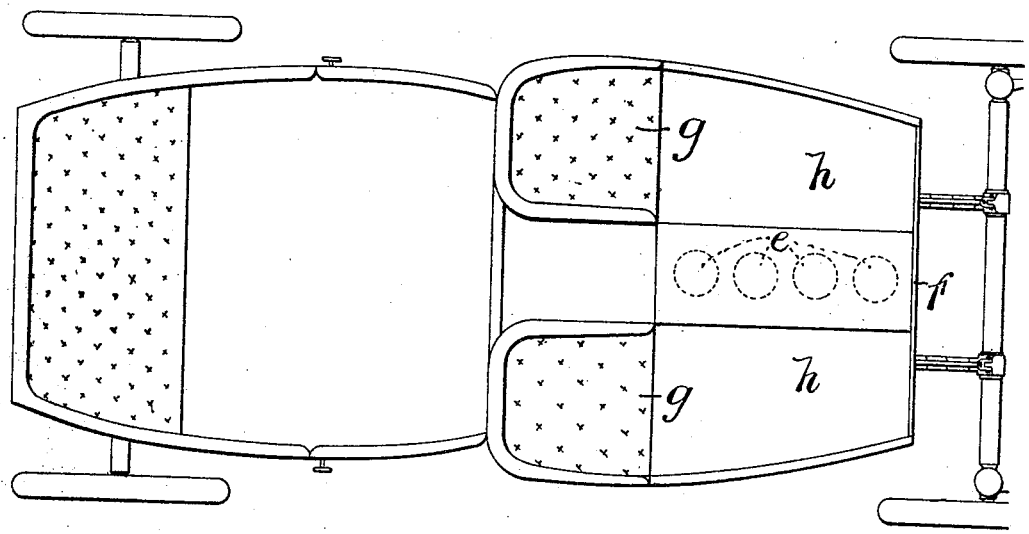
Figure 3:
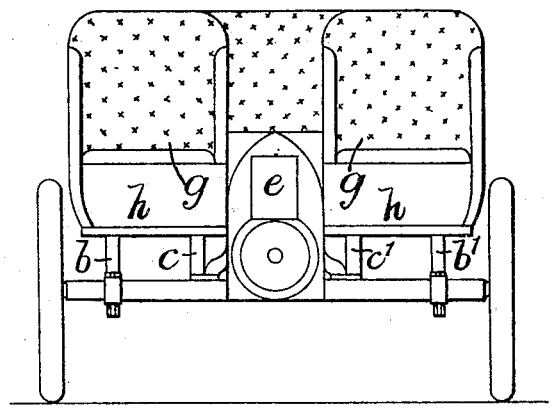
Figure 6:
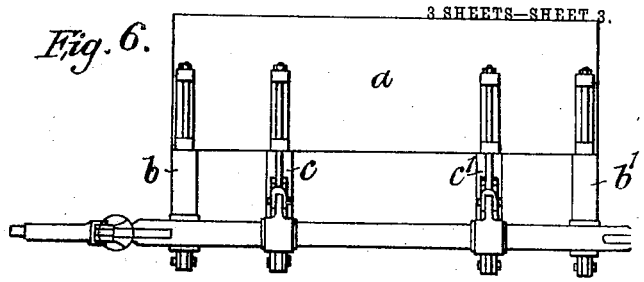
Figure 5:
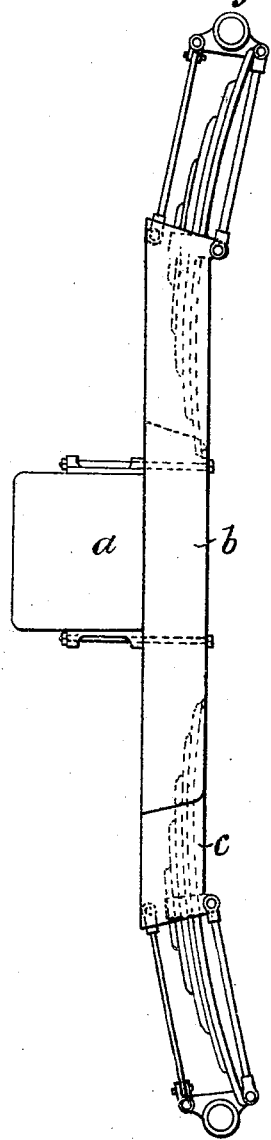
Figure 4:
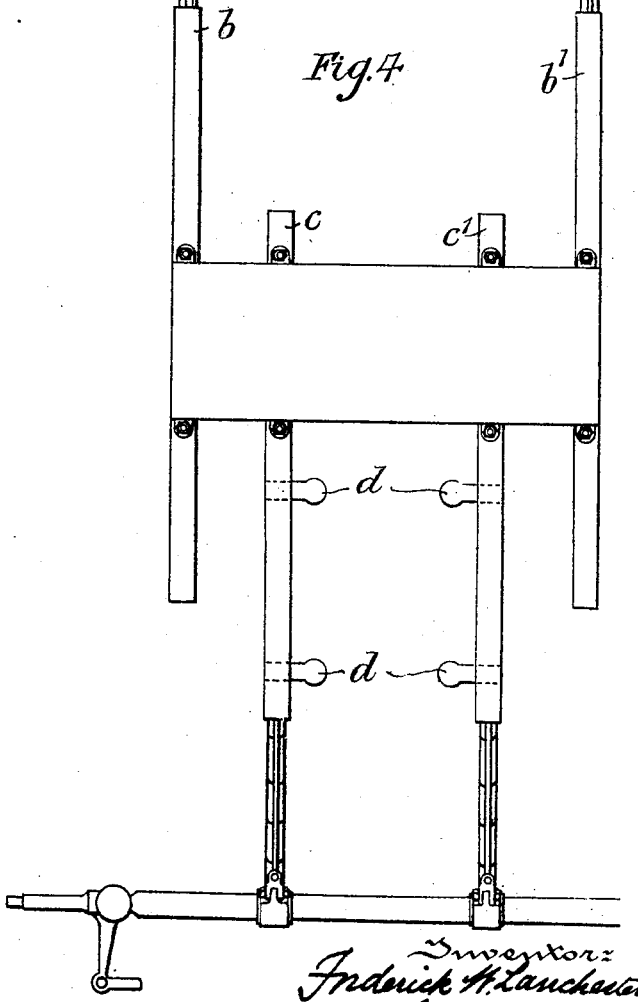

Referring now to the accompanying drawings, Figures 1, 2, and 3 are diagrammatic side elevation, plan, and front elevation, respectively, of a motor-vehicle according to my invention. Figs. 4, 5, and 6 are plan, side elevation, and end view of the framework of a vehicle in accordance with my invention.

In one mode of carrying my present invention into effect as applied to a vehicle of the coupé or landaulet type I build up a frame of which the principal constructional limb consists of a transverse rectangular tube $a$ of large dimensions, which may in some cases conveniently serve as a tank for the storage of fuel. To the under side of this tube are bolted four longitudinal limbs $b\ b'$ and $c\ c'$. The two inner ones $c\ c'$ by extending forward act as bearers on which the motor rests or is bolted, suitable projections $d\ d$ being provided for that purpose, if desired. The two outer limbs $b\ b'$ support the superstructure of the carriage and extend to the front and rear of the transverse tube or tank $a$. The four longitudinal limbs may be made of light rolled joist or may be of rectangular drawn tube or be built up out of sheet; but in any case their function is to give the necessary vertical stiffness to the frame, and they must be so secured to the transverse member $a$ as to utilize its torsional strength to the utmost advantage.

The function of the inner longitudinals $c\ c'$ as well as being to support the motor is to carry at their forward parts the forward suspension organs, so that the outer longitudinals $b\ b'$ may be cut short forward sufficiently to clear the steering-wheels, and thereby permit of a wide angle of lock. Instead of ending the inner members $c\ c'$ close to the rear of the tank they may with advantage be prolonged aft to help support the floor of the vehicle and the after ends of all four members connected by a light transverse brace to distribute lateral stresses.

The outer longitudinals $b\ b'$, in addition to forming the main support for the vehicle-body, are subjected to the stresses of the rear suspension, the car being suspended at the rear through the rear parts of the outer members of the frame. It will be seen that in this arrangement of frame the longitudinal members as a whole act as a beam to support the weight of the vehicle; but it will also be noted that the bending stress is transferred from the inner members $c\ c'$ to the outer members $b\ b'$ at the points where they are respectively connected to the tank member $a$, the stress between these points being conveyed as a torque by the tank-shell itself. The tank-shell, the longitudinal members, and their attachments must be so proportioned as to be capable of transmitting the stresses required in the manner indicated. Any suitable suspension may be employed. I prefer, however, to use a cantaliver suspension of the character shown in the drawings.

The arrangement of motor and mechanism that I prefer to employ in accordance with my present invention is as follows: A multicylinder engine $e$ of the vertical type (see Figs.

1, 2, and 3) is built as narrow as conveniently possible in its upper works and is arranged to be supported by the inner members $c\ c'$ of the frame immediately forward of the tank member $a$, which is arranged as the immediate support of the front or driving seat of the car. The engine position may be defined as occupying the center of the space forward of the front seat and immediately behind the dashboard $f$ instead of, as is usually the case, directly in front. In this position a much larger proportion of its weight is thrown on the driving-wheels, and the driving-seat can be arranged farther forward than would otherwise be possible in view of the exigencies of correct "ballasting." I prefer to arrange the change-gear box and clutch in a self-contained case bolted securely to the motor in any convenient manner; but the construction hereinbefore described is such as will render the employment of a separately-supported gear-box quite satisfactory. It will be seen that as the engine is accommodated in the center of the space forward of the front seat and immediately behind the dashboard that space and the front footboard are divided by the engine, and the front seat is likewise divided into two seats $g\ g$, (see Figs. 1, 2, and 3,) one on each side of the engine, each seat being central to a foot-space $h$. The engines are of course inclosed in a suitable casing made as narrow as possible at the upper part, so as not to reduce more than necessary the width of the foot-spaces on each side of the motor.

My invention enables me to provide a convenient side entrance to the vehicle with a moderate length of wheel-base, to improve the distribution of the weight between the front and rear wheels, and at the same time to obtain a wider angle of lock than is usual in cars as at present constructed.

Having now described my invention, what I claim as new, and desire to secure by Letters Patent, is—

1. A motor-vehicle in which the motor is situated in the leg-space of the front seat and in proximity to the dashboard of the vehicle, substantially as and for the purposes set forth.

2. A motor-vehicle in which the motor is situated in the leg-space forward of the front seat of the vehicle and to the rear of the dashboard, the motor equally dividing said space longitudinally, substantially as and for the purposes set forth.

3. A motor-vehicle having the motor situated in the leg-space forward of the front seat of the vehicle and to the rear of the dashboard, the motor dividing the leg-space longitudinally and its center of weight being considerably to the rear of the centers of the front wheels, a rear seat and a side entrance for said seat, substantially as described.

4. A motor-vehicle having a chassis-frame consisting of a transverse tubular member and a plurality of longitudinal members secured thereto, some of the members which are nearest the longitudinal center of the car extending forward and supporting the motor while others more remote from said center extend to the rear, substantially as described.

5. A motor-vehicle having a chassis-frame consisting of a transverse tank to which are secured four longitudinal members the inner two of said members being extended forward to support the engine while the outer two extend rearward, substantially as described.

6. A motor-vehicle having a chassis-frame consisting of a transverse tank to which are secured four longitudinal members the inner two of said members being extended forward to carry the fore suspension while the other two members extend rearward to carry the rear suspension, a front seat on said tank and a motor carried on the forward members, said motor dividing the front leg-space longitudinally, substantially as described.

In testimony whereof I have signed my name to this specification in the presence of two subscribing witnesses.

FREDERICK WILLIAM LANCHESTER.

Witnesses:
EDWARD MARKS,
JOHN MORGAN.